N. B. Brown,
Windlass.
No. 81,470. Patented Aug 25, 1868.
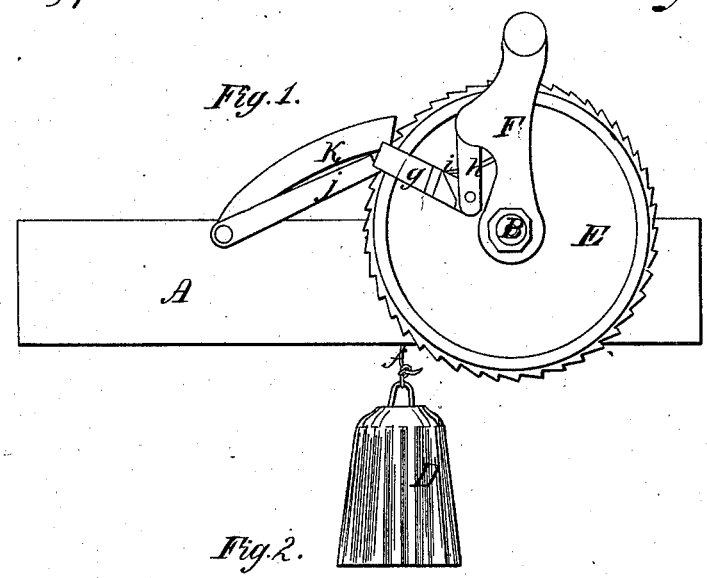
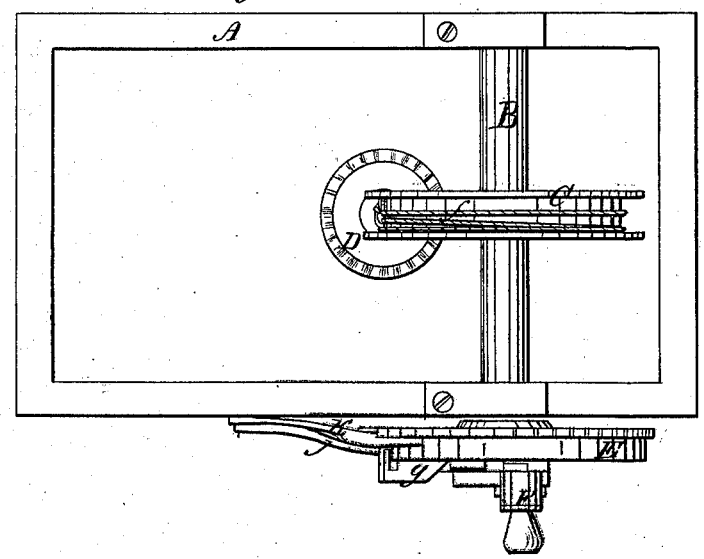
Witnesses.
Inventor:

United States Patent Office.

N. B. BROWN, OF ANTWERP, NEW YORK.

Letters Patent No. 81,470, dated August 25, 1868; antedated August 17, 1868.

IMPROVED WINDLASS.

The Schedule referred to in these Letters Patent and making part of the same.

TO ALL WHOM IT MAY CONCERN:

Be it known that I, N. B. BROWN, of Antwerp, in the county of Jefferson, and in the State of New York, have invented certain new and useful Improvements in Windlasses; and do hereby declare that the following is a full, clear, and exact description thereof, reference being had to the accompanying drawings, and the letters of reference marked thereon.

In the annexed drawings, making a part of this specification, A represents a suitable frame, of any desired dimensions and material, and B represents a shaft, adjusted across the frame, in a horizontal position. In the middle of the shaft is secured a spool, C, of any suitable size, over which passes a cord, $f$, which is wound up thereon, or let out, at will.

D represents a weight, of any magnitude required, or an object to be elevated, to which the cord $f$ is secured. At one end of the shaft B is secured a cog-wheel or ratchet-wheel, E, provided with a lateral flange on the outside face thereof, as shown in the drawings, and outside of the said wheel E is loosely adjusted, around the end of the shaft B, a crank, F. The crank F is provided with a projection, as seen in Figure 1 of the drawings. To this projection is pivoted a link, $h$. $g$ represents a clutch, the jaws of which embrace the flange, and work around the periphery or face of the wheel E, and is pivoted at its inner end to the link $h$, and projects down alongside the outer face of the wheel E to the shaft B.

Between the clutch $g$ and a projection on the crank F is adjusted or secured a small spring, $i$, for the purpose of holding the said clutch $g$ in its proper position in relation with the flange of the wheel E. When the crank F is turned forward, the clutch catches on the flange of the wheel E, and carries the same forward, and thereby turns the shaft B, and thus the cord $f$ is wound up, and the weight or object D is elevated as far as may be desired.

K represents a pawl, pivoted to the frame A, and catches in the teeth of the ratchet-wheel E, to prevent the same from turning backward, and provided with a projection which is bevelled off so as to be thrown out of gear, by means of the clutch $g$, when the same may be turned backward.

$j$ represents a brake or rubber, pivoted to the frame A, near the pawl K, and resting on the face of the flange of the wheel E, just under the said pawl K. Said brake $j$ has its under side bevelled off at the end which rests on the wheel E, and also a small notch in the same end, on which the clutch $g$ may catch, and press the same firmly against the face of the wheel E, when said clutch is turned or brought backward.

It will be seen that the clutch will pass under the brake $j$ and pawl K, and the wheel turn forward as far as may be desired, and that the pawl K will hold the wheel and shaft as long as required; also, when it may be desired to lower the weight D, all that is necessary is to turn the crank backward, and the clutch slips along and around the flange of the wheel E, and raises the pawl K, and then brought against and into the notch of the brake $j$, and thus the weight may be let down as gently and easily as may be required.

It will be readily seen that this is a superior device for a windlass to anything ever before known or used.

Having thus fully described my invention, what I claim as new, and desire to secure by Letters Patent, is—

1. The brake $j$, in combination with a ratchet-wheel, E, and clutch $g$, the several parts being constructed and operated substantially as and for the purpose specified.

2. The arrangement of the shaft B, wheel E, and crank F, with the clutch G, pawl K, and brake $j$, when the various parts are constructed and operated as and for the purpose herein fully set forth.

In testimony that I claim the foregoing, I have hereunto set my hand, this    day of    , 1867.

N. B. BROWN.

Witnesses:
   A. CHAPIN,
   J. T. HOFFER.